United States Patent [19]

O'Brien

[11] Patent Number: 4,896,939

[45] Date of Patent: Jan. 30, 1990

[54] HYBRID FIBER OPTIC/ELECTRICAL CABLE AND CONNECTOR

[75] Inventor: Donald G. O'Brien, N. Hampton, N.H.

[73] Assignee: D. G. O'Brien, Inc., Seabrook, N.H.

[21] Appl. No.: 115,258

[22] Filed: Oct. 30, 1987

[51] Int. Cl.[4] .............................................. G02B 6/44
[52] U.S. Cl. ........................... 350/96.23; 174/110 R; 174/113 R; 350/96.20; 350/96.21; 439/208; 439/210; 439/578
[58] Field of Search ............... 350/96.23, 96.20, 96.21, 350/96.22; 439/207, 208, 210, 211, 453, 460, 578, 604; 174/70 R, 74 R, 75 R, 75 C, 98, 110 R, 113 R, 113 A

[56] References Cited

U.S. PATENT DOCUMENTS

| | | | |
|---|---|---|---|
| 4,156,104 | 5/1979 | Mondello | 174/70 R |
| 4,239,336 | 10/1980 | Parfree et al. | 350/96.23 |
| 4,278,835 | 7/1981 | Jackson | 174/70 R |
| 4,348,076 | 9/1982 | Oldham | 350/96.22 |
| 4,359,598 | 11/1982 | Dey et al. | 174/40 R |
| 4,371,234 | 2/1983 | Parfree et al. | 350/96.23 |
| 4,373,777 | 2/1983 | Borsuk et al. | 350/96.20 |
| 4,545,645 | 10/1985 | Mignien | 350/96.21 |
| 4,606,604 | 8/1986 | Soodak | 350/96.23 |
| 4,623,218 | 11/1986 | Laurette et al. | 350/96.23 |
| 4,671,610 | 6/1987 | Kitayama et al. | 350/96.23 |
| 4,679,898 | 7/1987 | Grooten | 350/96.23 |
| 4,690,497 | 9/1987 | Occhini et al. | 350/96.23 |
| 4,699,461 | 10/1987 | Taylor et al. | 350/96.23 |
| 4,717,232 | 1/1988 | Priaroggia | 350/96.20 |
| 4,723,832 | 2/1988 | Okazato et al. | 350/96.23 |
| 4,763,981 | 8/1988 | Wilkins | 350/96.23 |
| 4,767,182 | 8/1988 | Parfree et al. | 350/96.23 |

*Primary Examiner*—Frank Gonzales
*Attorney, Agent, or Firm*—Lahive & Cockfield

[57] ABSTRACT

Communication cable includes an optical fiber, a first tubular electrical conductor enclosing the optical fiber, a second tubular electrical conductor enclosing the first electrical conductor, and a dielectric support element disposed between the conductors for maintaining the conductors in a coaxial relationship, with a selected uniform electrical impedance therebetween. Connectors for coupling such cable include plug and receptacle modules for connecting respective electrical and optical elements in the cable.

9 Claims, 4 Drawing Sheets

HYBRID FIBER OPTIC/ELECTRICAL CABLE AND CONNECTOR

BACKGROUND OF THE INVENTION

This invention relates in general to signal communication cables and connectors, and in particular, provides apparatus for transmitting signals and electrical power via an integrated assembly of optical fibers and electrical conductors.

Optical fibers are used to transmit signals in a variety of applications, including submarine cables. Signal repeaters and amplifiers are usually Provided at intervals along the length of submarine cables, to compensate for signal attenuation by the cables. Such repeaters require electrical power carried by metallic conductors. In conventional submarine optical cable practice, electrical power is provided to repeaters and other associated submarine electrical devices by separate electrical cables. The plurality of cables thus required increases the complexity and cost of deploying and operating submarine cable, and reduces reliability by increasing the probability of infiltration by seawater under hydrostatic pressure.

A number of optical fiber cable and connector configurations which incorporate metallic conductors have been developed. The following U.S. Patents disclose examples of such cables and connectors:

4,156,104—Mondello
4,239,336—Parfree et al
4,278,835—Jackson
4,371,234—Parfree et al
4,606,604—Soodak The Mondello patent discloses an optical fiber cable including a core of optical fibers surrounded by stranded steel layers. A metallic tubular jacket surrounds the stranded steel layers to provide a DC path for powering optical repeaters.

The Parfree et al ('336) patent discloses a cable including optical fibers disposed within a tubular electrical conductor.

The Jackson patent discloses an optical fiber cable wherein the optical fibers are disposed within a copper or aluminum tube. The electrically conductive tube allows the transmission of electrical power between repeaters.

The Parfree et al ('234) patent discloses an optical fiber cable having a central strength member over which are laid optical fibers. The fibers are surrounded by a sheath which itself is within an aluminum tube usable to convey electrical power for repeaters.

The Soodak patent discloses a cable including an optical fiber bundle sealed in an electrically conductive metallic tube.

The above patent accordingly describe optical fiber cables and connectors which incorporate a single electrical conductor. However, the prior art cables described in the above patents do not Provide a compact, easily fabricated configuration including an optical fiber core and Plural insulated electrical conductors. A compact optical fiber cable having plural electrical conductors could conduct electrical power and signals to cable-associated electrical devices more efficiently, and with potentially higher reliability, than conventional single-conductor cables. There accordingly exists a need for a compact configuration of optical fibers and Plural electrical conductors suitable for submarine cable applications.

It is accordingly an object of the invention to provide an improved hybrid fiber optic/electrical submarine cable and corresponding connectors.

It is another object of the invention to Provide a compact fiber optic/electrical cable and connector configuration offering low signal attenuation and enhanced resistance to infiltration of seawater under hydrostatic pressure.

It is a further object of the invention to provide a connector for a fiber optic/electrical cable which is compact, robust and easily assembled.

Other general and specific objects of the invention will in part be obvious and will in part appear hereinafter.

SUMMARY OF THE INVENTION

The invention provides communication cables having at least one optical fiber, a first tubular electrical conductor supportingly enclosing the optical fiber, a second tubular electrical conductor coaxially enclosing the first electrical conductor, and a dielectric support element seatingly disposed between the first and second electrical conductors for maintaining the first electrical conductor at a selected relative location within the second electrical conductor. The invention provides a cable wherein the first and second electrical conductors have a selected electrical impedance therebetween.

In another aspect of the invention, the cable includes an external dielectric sheath surrounding the second electrical conductor.

The invention further provides a connector for coupling like communication cables containing both fiber optic and electrically conductive elements. The connector includes a plug housing having a cable-receiving channel and a plug housing face. The plug housing contains a first electrically conductive plug sleeve for electrical contact with an inner electrical conductor of a first cable and for supportingly positioning an optical fiber of the first cable in a selected axial dimensional relationship with said plug housing face. The plug housing also contains a second electrically conductive plug sleeve for electrical contact with an outer electrical conductor of first cable.

A connector according to the invention also includes a receptacle housing having a cable-receiving channel and a receptacle housing face. The receptacle housing is adapted for axially mating with the plug housing and contains a first electrically conductive receptacle sleeve for electrical contact with an inner electrical conductor of a second cable and for supportingly positioning an optical fiber of the second cable in a selected axial dimensional relationship with the receptacle housing face. The receptacle housing also contains a second electrically conductive receptacle sleeve for electrical contact with an outer electrical conductor of the second cable, and support elements for supportingly positioning first and second electrically conductive receptacle sleeves for contact with the first and second electrically conductive plug sleeves respectively.

The invention additionally provides elements for urging together the plug housing and the receptacle housing so that the optical fibers are brought together in selected highly-efficient signal-transmitting alignment.

In a further aspect, the invention provides a dielectric element for locating the first electrically conductive sleeve elements in a selected radial dimensional relationship with the second electrically conductive sleeve, and dielectric elements for locating the first electrically conductive sleeve in a selected radial dimensional relationship with the plug housing.

The invention also provides elements for resisting infiltration of seawater under hydrostatic pressure into the interface between the first and second cables. These pressure-resisting elements include a first sealing assembly for sealing the second electrically conductive Plug and receptacle sleeves to respective plug and receptacle housings, a second sealing assembly for sealing the first electrically conductive plug and receptacle sleeves to respective second electrically conductive sleeves and a third sealing assembly for sealing between the receptacle housing and the second electrically conductive plug sleeve.

The invention provides a compact, robust and reliable cable and connector assembly which is resistant to hydrostatic pressure, and which is simple to manufacture and use.

The invention accordingly comprises apparatus embodying features of construction, combinations of elements and arrangements of parts as exemplified in the following detailed disclosure, and the scope of the invention is indicated in the claims.

DESCRIPTIONS OF THE DRAWINGS

For a fuller understanding of the nature and objects of the invention, reference should be made to the following detailed description and the accompanying drawings, in which.

DESCRIPTION OF ILLUSTRATED EMBODIMENTS

Figure 1A:
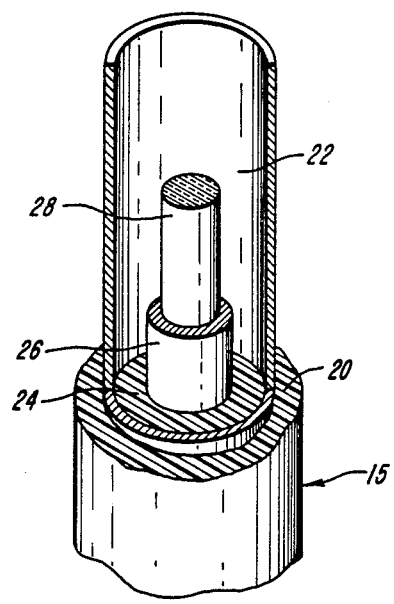
FIG. 1A is a partially broken-away fragmentary perspective view of a combined optical fiber and electrical conductor cable according to the invention.
Figure 1B:
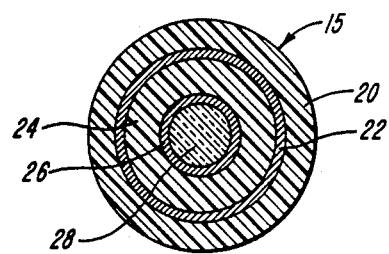
FIG. 1B is a sectional view of the cable of FIG. 1A.

FIGS. 1A and 1B illustrate a hybrid optical fiber-/electrical conductor cable according to the invention. The cable 15 contains a central optical fiber 28 surrounded by a metallic tube or sheath 26. This tube 26 serves as a strength member and inner electrical conductor, and is preferably constructed of aluminum or copper alloy. The assembly of optical fiber 28 and inner conductor 26 can be constructed from OPTICORE optical fiber tubing manufactured by Olin Corporation.

Inner conductor 26 is surrounded by a dielectric support element 24, which preferably is a tube or sheath of dielectric material such as Polyethylene. The dielectric layer 24 is surrounded by an outer conductor 22. The illustrated outer conductor 22 is a solid-walled tubular structure. Alternatively, the outer conductor structure, can, by way of example, be constructed from layers of conductive tape, braided or woven strands, or perforated conductive material. Copper or aluminum alloy are preferred materials for outer conductor 22, because of their low resistivity. Dielectric layer 24 thus separates inner conductor 26 from outer conductor 22, and maintains the inner conductor 26 at a selected relative location within outer conductor 22.

Those skilled in the art will understand that while FIGS. 1A and 1B illustrate the dielectric element 24 as a sheath or layer of dielectric material, the dielectric element 24 could alternatively be formed from a series of radially extending spacer elements and an air gap, separating the inner conductor 26 from the outer conductor 22. The function of the dielectric layer 24 is to maintain a selected geometry and separation, preferably co-axial, between the inner conductor 26 and the outer conductor 22, thereby maintaining a selected electrical impedance between the two conductors.

In a preferred embodiment of the invention, the outer conductor 22 is surrounded by an external protective layer 20 of dielectric material, such as polyethylene.

The illustrated configuration of a single optical fiber 28 and coaxial electrical conductors 26 and 22 provides a compact, high strength cable capable of efficient transmission of optical signals, wide bandwidth electrical signals, and DC or AC electrical power. A corresponding connector configuration for the cable of FIGS. 1A and 1B is shown in FIGS. 2–4.

Figure 2:
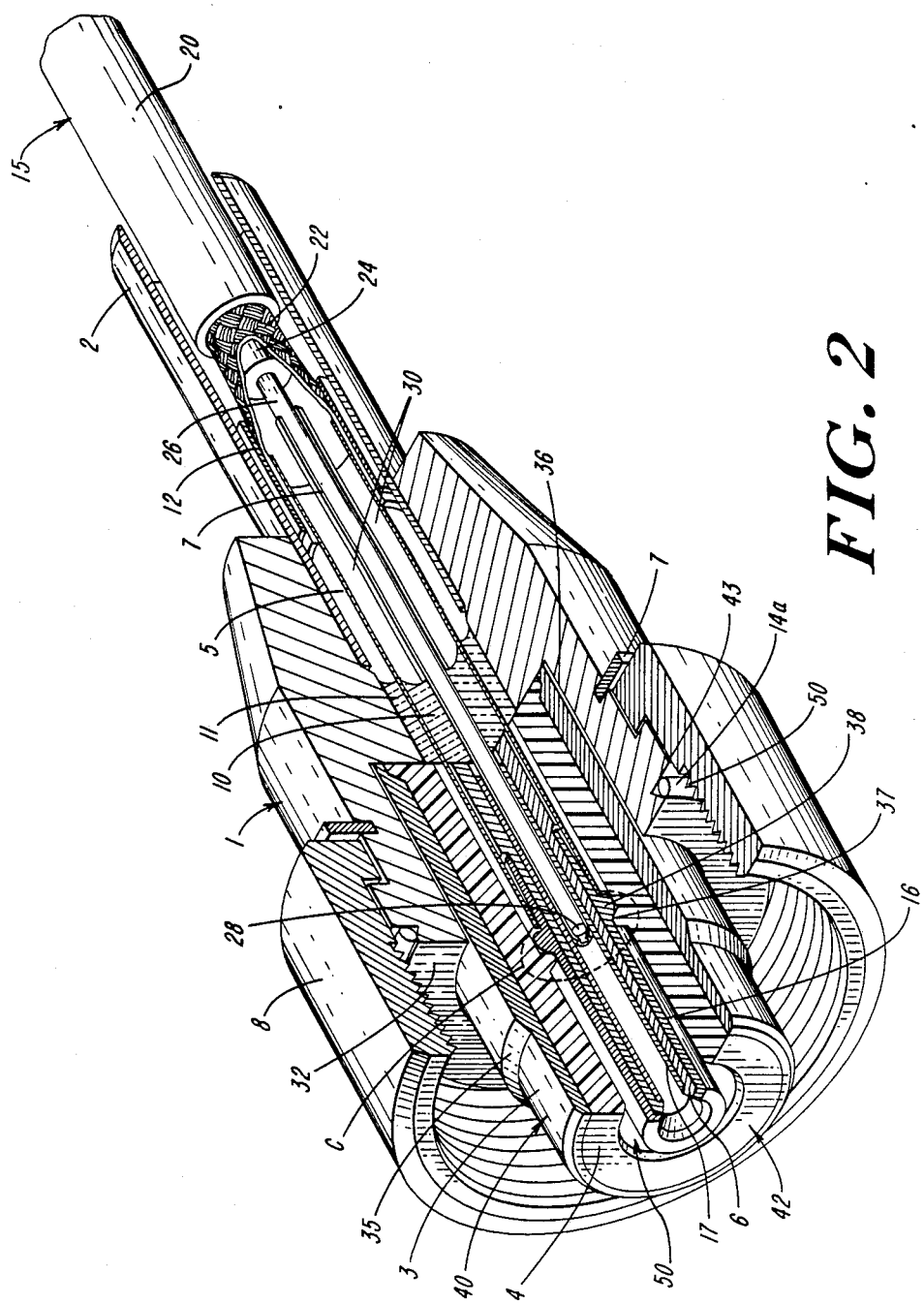
FIG. 2 is a partially broken-away view of a connector plug housing according to the invention connected to the cable of FIG. 1.
Figure 3:
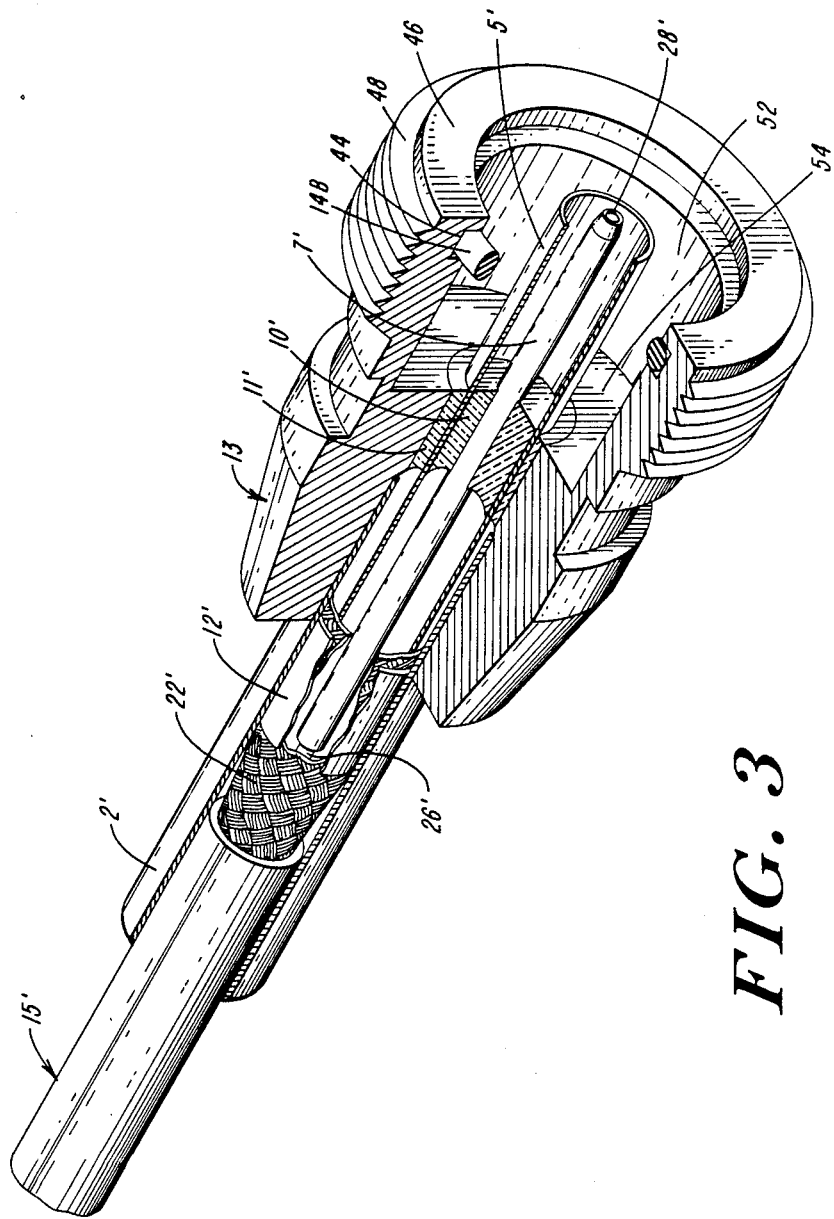
FIG. 3 is a partially broken-away view of a connector receptacle housing according to the invention connected to the table of FIG. 1.
Figure 4:
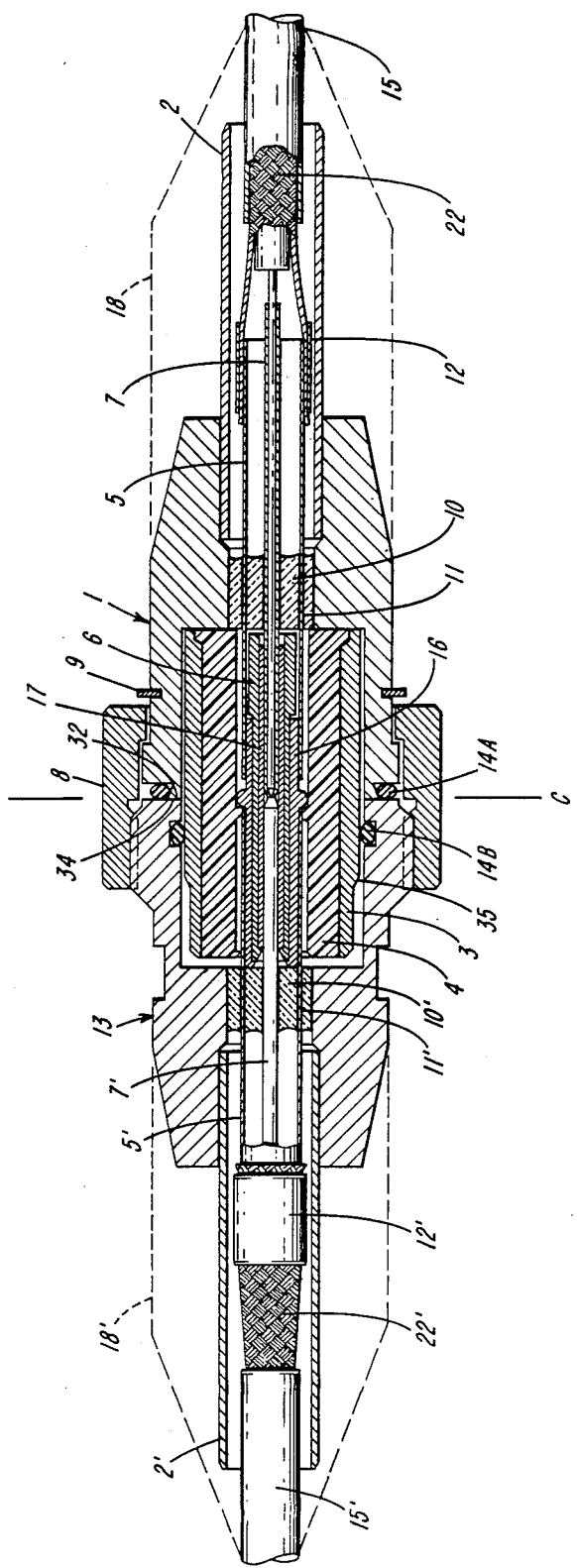
FIG. 4 is a partially broken-away view of a connector according to the invention, showing the assembled cables, plug housing and receptacle housing of FIGS. 1–3.

FIGS. 2 and 3 respectively illustrate plug and receptacle portions of a connector for coupling two like cables as illustrated in FIGS. 1A and 1B and described above. The connector is shown in assembled form in FIG. 4.

Referring to FIG. 2, cable 15 enters connector plug housing 1 through a cable-receiving channel in tail extension 2. The plug housing 1 is preferably constructed from stainless steel. The tail extension 2, preferably constructed of metal or high strength plastic, serves as a strain relief for the cable 15. Resilient overmolds, indicated by reference numbers 18, 18' in FIG. 4, may be bonded to the tail extensions 2, 2' of plug housing 1 and receptacle housing 13, respectively.

Again referring to FIG. 2, the braided outer conductor 22 of cable 15 is physically and electrically connected by crimp sleeve 12 to a hollow cylindrical shield contact 5. Shield contact 5 in turn forms a slip fit over, and electrical connection with, the cylindrical outer surface of double-ended contact 16, which axially extends out past the parting plane or optical fiber interface of the connector, indicated in FIG. 2 by a dashed circle C, to the mating end of the plug portion.

The inner conductor 26 of the cable 15, containing optical fiber 28, forms an interference fit with, and is electrically connected with, pin contact 7. Pin contact 7 in turn is fitted within alignment contact pin 17, which extends axially beyond the connector parting plane C to the mating, or distal end of the plug portion, which is leftmost in FIG. 2.

FIG. 2 also shows that pin contact 7 and shield contact 5, which respectively form physical and electrical extensions of inner conductor 26 and outer conductor 22, are separated by a tubular air gap 30 where they enter the plug housing 1. The distal extensions of pin contact 7 and shield contact 5 are separated from each other by an inner annular glass element 10, which provides high dielectric and excellent strength properties. Moreover, the distal extension of shield contact 5 is separated from metal plug housing 1 by outer glass element 11. The function and manufacture of glass elements 10 and 11 are discussed in greater detail hereinafter in connection with FIG. 4.

Further referring to FIG. 2, alignment contact pin 17 is electrically insulated from double-ended contact 16 by center insulator 6. As FIG. 2 indicates, the distal extension of center insulator 6 has a reduced outside diameter to fit within the inside diameter of double-ended contact 16.

A metal nosepiece 3, containing nosepiece insulator 4, is bonded to surface 36 of plug housing 1. A selected clearance is maintained between the inner diameter of insulator 4 and the outer diameter of double-ended contact 16, in order to receive corresponding electrical contacts from the receptacle portion of the connector. As FIG. 2 illustrates, insulator 4 preferably has an internal annular ridge 37 adapted to capture an external annular ridge 38 on double-ended contact 16. The outer surface of cylindrical nosepiece 3 thus defines the outer surface of an electrical plug extension 40 axially extending past the plug housing face 32, which is co-planar with optical fiber interface plane C. Electrical plug extension 40 contains several conductor, insulator and structural elements, each of which terminate at the distal end of plug 1, in substantially the same plane, i.e. at the distal end of surface 42. Those elements, which are co-axially disposed, are alignment contact pin 17 (which is the electrical extension of the inner conductor 26), center insulator 6, double-ended contact 16 (which is the electrical extension of the outer conductor 22), nosepiece insulator 4, and nosepiece 3. Nosepiece 3 is preferably provided with a beveled shoulder 35, discussed in greater detail hereinafter.

In the illustrated preferred embodiment of the invention, radial end face 32 of plug housing 1 is flat and axially precise. A peripheral channel 43 is disposed radially outward of, and axially behind, face 32, and is dove-tailed to capture and retain a compressible sealing element such as O-ring 14A. O-ring 14A serves to seal the plug housing 1 against the infiltration of liquid under hydrostatic pressure, in a manner more fully described hereinafter. Plug housing 1 is further provided with a coupling ring 8 having internal threads 50, and an assailed retaining ring 9, for coupling the plug housing 1 with the corresponding receptacle housing 13 illustrated in FIG. 3.

FIG. 3 illustrates a receptacle housing 13, including a receptacle housing face 46 defining a distal end, right-most in the drawing, and a tailpiece 2 having a cable-receiving channel, adapted to axially mate with the plug housing 1 of FIG. 2. Receptacle housing 13, like plug housing 1, is preferably constructed of stainless steel. (Elements in FIG. 3 of a cable as in FIG. 1 and which are common to the illustrated plug of FIG. 3 bear the same reference number with the addition of an apostrophe.)

The arrangement of internal components in receptacle housing 13 is similar to that of plug housing 1 described above. The receptacle housing 13 includes a shield contact 5' electrically connected by crimp sleeve 12' with braided outer conductor 22' of cable 15', and a pin contact 7' in electrical connection with inner conductor 26' of cable 15', which, in accordance with the invention, contains optical fiber 28'.

An inner annular glass element 10' separates pin contact 7' from shield contact 5', and an outer annular glass element 11' separates shield contact 5' from receptacle housing 13. In a preferred embodiment of the invention, receptacle 13 has an internal annular channel 44 which seats a compressible sealing element such as O-ring 14B. Additionally, receptacle housing 13 preferably has external threads 48 adapted to engage and mate with the internal threads 50 of coupling ring 8.

In the embodiment illustrated in FIG. 3, optical fiber 28' extends distally to a point co-planar with receptacle housing face 46, so that when the plug and receptacle portions of the connector are assembled, receptacle housing face 46 abuts plug housing face 32, and optical fiber 28' abuts optical fiber 28. Pin contact 7' and shield contact 5' terminate distally at a location substantially co-planar with receptacle housing face 46, so that when the plug and receptacle portions of the connector are assembled, pin contact 7' and shield contact 5' respectively engage alignment contact pin 17 and double-ended contact 16 of the plug portion.

The illustrated receptacle housing 13 includes a recess 52 and an axially recessed receptacle end face 54. When the plug and receptacle portions of the connector are assembled, recess 52 receives electrical plug extension 40, and axially recessed receptacle end face 54 abuts plug face 42.

FIG. 4 is a partially broken-away view of an assembled connector according to the invention, showing the cables, plug housing and receptacle housing of FIGS. 1–3. When the plug housing 1 is mated with the receptacle housing 13, pin contact 7' of receptacle housing 13 is telescopingly inserted into alignment contact pin 17 of plug housing 1, thus electrically connecting the respective inner conductors 26 and 26' of cables 15 and 15'. Additionally, shield contact 5' of receptacle housing 13 is telescopingly inserted into the gap 50 between double-ended contact 16 and insulator 4 of plug housing 1, forming an interference fit with double-ended contact 16. Double-ended contact 16 electrically connects the respective outer conductors 22 and 22' of cables 15 and 15'.

Simultaneously, receptacle housing 13 telescopingly receives nosepiece 3 of plug housing 1. In particular, receptacle O-ring 14B engages the outer surface of nosepiece 3 and slides over shoulder 35 of nosepiece 3, forming an interference fit with the increased diameter of nosepiece 3. As plug housing face 32 approaches receptacle housing face 34, during assembly of plug housing 1 and receptacle housing 13, internal threads 50 of coupling ring 8 (shown in FIG. 2) engage external threads 48 of receptacle housing 13 (shown in FIG. 3). Coupling ring 8 preferably has wrench flats or spanner holes, not shown, for engagement by an appropriate tool to facilitate rotation of coupling ring 8. Retaining ring 9, inserted after coupling ring 8 is installed on plug housing 1, captures coupling ring 8 on plug housing 1.

As coupling ring 8 is tightened and plug housing face 32 more closely approaches receptacle housing face 34, plug housing face O-ring 14A is compressed between receptacle housing face 34 and plug housing face 32 at plane C.

Plug housing face O-ring 14A provides a primary seal against the infiltration of liquid into the interface between the optical and electrical terminations of the respective cables 15 and 15' under the high hydrostatic pressures encountered in a submarine application. Receptacle housing O-ring 14B provides a secondary seal against the infiltration of liquid.

In submarine applications, hydrostatic pressure will be transmitted through cables 15 and 15' into tailpiece extensions 2 and 2'. A preferred embodiment of the invention therefore incorporates the inner and outer glass elements 10, 10', 11, and 11', which provide primary pressure-resisting structure against hydrostatic pressure sustained by cables 15 and 15'.

Those skilled in the art will recognize that axial and radial alignment of the two optical fibers 28 in intimate signal-transmitting alignment is significant to attain low-loss optical signal coupling. In accordance with the invention, radial alignment is controlled in part by control of the inner and outer glass elements 10 10', 11, and 11', which radially locate the pin conductors 7 and 7'. Axial alignment is provided by abutment of the end faces 32 and 46.

In a preferred practice of the invention, during manufacture of the plug housing 1 and receptacle housing 13, respective optical fibers 28 and housing faces 32 and 46 are ground and polished until they are co-planar. A thin layer of plating material, such as chromium, is applied to at least one face 32 and 46. The plating layer has a specified thickness, e.g. of approximately 0.00025 inch. As a result, when faces 32 and 46 are engaged, a gap on the order of 0.0005 inch exists between the ends of the respective optical fibers 28 and 28'. This gap eliminates spalling and cracking of the optical fibers.

In a further preferred practice of the invention, plug housing 1 and receptacle housing 13 are in part assembled by affixing respective contacts 5, 5', 7 and 7', and introducing a selected volume of glass into the desired locations for glass elements 10, 10', 11 and 11'. The assembly is then heated on a firing fixture, and the alignment of the pin contacts 7 and 7' is established during sintering of the glass. During firing, the metallic components preferably develop a selected oxide coating to which the glass adheres. Upon cooling, the glass remains fused to the adjacent metallic components, providing a selected radial alignment of pin conductors 7 and 7' and a secure pressure bulkhead. Optical fibers 28 and 28' are in turn anchored to respective pin conductors 7 and 7' by adhesive, such as epoxy.

It will thus be seen that the invention efficiently attains the objects set forth above, among those made apparent from the preceding description. In particular, the invention provides a compact, robust and reliable cable and connector assembly which are simple to manufacture and use.

It will be understood that changes may be made in the above construction and in the foregoing sequences of operation without departing from the scope of the invention. It is accordingly intended that all matter contained in the above description or shown in the accompanying drawings be interpreted as illustrative rather than in a limiting sense.

It is also to be understood that the following claims are intended to cover all of the generic and specific features of the invention as described herein, and all statements of the scope of the invention which, as a matter of language, might be said to fall therebetween.

Having described the invention, what is claimed as new and secured by Letters Patent is:

1. A signal communication cable having at least one optical fiber and further comprising first conductor means, including
A. a first tubular electrical conductor enclosing said optical fiber, for supporting said optical fiber,
B. a second tubular electrical conductor coaxially enclosing said first electrical conductor, and
C. dielectric support means seatingly disposed between said first and second electric conductors, said dielectric support means providing a substantially uniform dielectric layer having a uniform dielectric constant along said cable, for maintaining said first electric conductor at a selected relative location within said second electrical conductor, and for maintaining a selected electrical impedance between said first and second electrical conductors so that said first and second electrical conductors are substantially coaxial, and so that said first and second electrical conductors have a selected uniform electrical impedance therebetween.

2. A cable according to claim 1 further comprising an external dielectric sheath surrounding said second electrical conductor.

3. A signal connector for connecting like communication cables containing both fiber optic and electrically conductive elements, said connector comprising
A. a plug housing having a cable-receiving channel and a plug housing face, said plug housing including
   (i) first electrically conductive plug sleeve means for electrical contact with an inner electrical conductor of a first said cable and for supportingly positioning an optical fiber of said first cable in a selected axial dimensional relationship with said plug housing face and
   (ii) second electrically conductive plug sleeve means for electrical contact with an outer electrical conductor of said first cable, and
B. a receptacle housing having a cable-receiving channel and a receptacle housing face, said receptacle housing being adapted for axially mating with said plug housing and including
   (i) first electrically conductive receptacle sleeve means for electrical contact with an inner electrical conductor of a second said cable and for supportingly positioning an optical fiber of said second cable in a selected axial dimensional relationship with said receptacle housing face,
   (ii) second electrically conductive receptacle sleeve means for electrical contact with an outer electrical conductor of said second cable, and
   (iii) means for supportingly positioning said first and second electrically conductive receptacle sleeve means for contact with said first and second electrically conductive plug sleeve means, respectively.

4. A connector according to claim 3 further comprising means for urging together said plug housing and said receptacle housing so that said optical fibers are brought together in selected signal-transmitting abutting alignment.

5. A connector according to claim further comprising
A. dielectric means for locating said first electrically conductive sleeve means in a selected radial dimensional relationship with said second electrically conductive sleeve means, and
B. dielectric means for locating said second electrically conductive sleeve means in a selected radial dimensional relationship with said plug housing.

6. A connector according to claim 3, further comprising means for resisting infiltration of liquid under hydrostatic pressure into an interface between said first and second cables, said pressure-resisting means including
A. first sealing means for sealing said second electrically conductive plug and receptacle sleeve means to respective plug and receptacle housings,
B. second sealing means for sealing said first electrically conductive plug and receptacle sleeve means to respective second electrically conductive sleeve means, and C. third sealing means for sealing between said receptacle housing and said second electrically conductive plug sleeve means.

7. Signal communication apparatus for coupling signals between first and second respective sets of mating optical and electrical conductors, said connection apparatus comprising
A. Plug means having
   (i) coaxial inner and outer electrical conductors electrically connected with a first outer conductor and with a first inner conductor respectively of said first conductor set,
   (ii) first fiber optic support tube means carried within said first inner conductor for supportingly receiving an optical fiber conductor of said first conductor set,
   (iii) tubular housing means to which said plug outer conductor is supportingly mounted,
   (iv) said housing means having a planar end face coaxially outward of said first support tube means and in selected precision axial location with an outer axial end of said first support, tube means,
B. receptacle means having
   (i) coaxial inner and outer electrical conductors electrically connected with a second outer conductor and with a second inner conductor respectively of said second conductor set,
   (ii) second fiber optics support tube means carried within said second inner conductor for supportingly receiving an optical fiber conductor of said second conductor set,
   (iii) tubular housing means to which said receptacle outer conductor is supportingly mounted,
   (iv) said receptacle means having a planar end face coaxially outward of said second support tube means and in selected precision axial alignment with an outer axial end of said second support tube means, and
C. coupling means for releasably and replaceably securing together said plug housing means and said receptacle housing means in concentric alignment, with said respective housing faces butted together, thereby to dispose said respective outer axial ends of said first and second support tubes in axial alignment with a precision axial gap therebetween, and with said receptacle inner and outer conductors telescopically engaged with said plug inner and outer conductors respectively.

8. Signal communication connection apparatus according to claim 7 further comprising
A. first pressure sealing means sealingly engaged between said secured-together plug and receptacle housing means, for sealing ambient fluid from the location of said aligned and precision-spaced support tube ends,
B. second pressure sealing means on said plug means sealingly engaged between said inner and outer electrical conductors of said plug means for blocking the transfer of fluid pressure axially between the location said aligned and precision-spaced support tube ends and locations in said plug means distal therefrom, and
C. third pressure sealing means on said receptacle means sealingly engaged between said inner and outer electrical conductors of said receptacle means for blocking fluid pressure axially between the location of said aligned and precision-spaced support tube ends and locations in said receptacle means distal therefrom.

9. Signal communication apparatus according to claim 7 further comprising
A. a first construction plane at which said plug housing end face is located,
B. a second construction plane axially forward of said first plane, and axial extensions of said plug inner conductor and of said plug outer conductor respectively terminating substantially at said second plane,
C. housing collar means secured to said plug housing and axially extending at least from said first plane to an axial termination thereof substantially at said second plane, and
D. means forming a tubular recess in said receptacle means axially extending backward from said receptacle housing end face located at said first plane to said second plane for telescopically receiving said axial extensions of said plug inner conductor and of said plug outer conductor and of said plug housing collar.

* * * * *